Patented Feb. 2, 1943

2,309,969

UNITED STATES PATENT OFFICE 2,309,969

MANUFACTURE OF AMINODIPHENYLETHER SULPHONIC ACIDS

Henry Martin, Basel, and Hans Heinrich Zaeslin, Riehen, near Basel, Switzerland, assignors to the firm J. R. Geigy A. G., Basel, Switzerland No Drawing. Application April 27, 1940, Serial No. 332,104. In Switzerland May 16, 1939

10 Claims. (Cl. 260—401)

This invention relates to an improvement in or modification of the invention set forth in the U. S. patent application Ser. No. 309,292, filed December 14, 1939, assigned to the same assignee as the present one.

That invention concerns a process for the production of aminoaryl sulphonic acid derivatives by reacting a monoamino sulphonic acid of the general formula

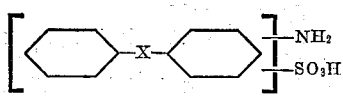

wherein X represents a divalent atom (such as O or S) or a divalent atom group (such as SO, $SO_2$, $CH_2$, CO, NH, NH—CO—NH), either with an aromatic, araliphatic or high molecular aliphatic monoacylating agent; or with any polyacylating agent; or with an aralkylating agent or an alkylating agent containing a high molecular alkyl radical which may be substituted or contain a hetero atom or hetero atom group in the alkyl part; or with the aforesaid aralkylating agent or alkylating agent followed by the action of any acylating agent; and introducing at least one halogen atom into the final compound, either by using a halogenated reaction component in the reaction or by halogenating the product of the said reaction.

All the final compounds produced according to the above said U. S. patent application are thus halogen containing ones, and are all notably suitable for moth-proofing wool, furs, feathers, hair, textile fabrics or the like, made fast to light, washing and fulling by the acid dyeing method.

It is very surprising now to find that halogen-free, colorless, acylated aminodiphenylether sulphonic acids containing a high molecular acyl radical and a very definite alkyl substitution can be used as moth-proofing agents. These products can be obtained by acylation of halogen-free aminodiphenylether sulphonic acids.

As halogen-free amino aryl sulphonic acids for use according to the present improvement or modification, only nuclear alkylated compounds so substituted by one or more alkyl groups, that if a single methyl group be present alone, it is best located in the p-position to the oxygen atom of the diphenylether radical, but other single alkyl groups and more methyl and other alkyl groups may be located in suitable positions of the two phenyl nuclei.

The aminoaryl sulphonic acids thus defined are reacted with high molecular aliphatic or araliphatic acylating agents which are so selected that no halogen will be present in the final product. For this purpose capric acid, palm nut fatty acid, lauric acid, stearic acid, palmitic acid, myristic acid, oleic acid, naphthenic acid, fencholic acid, resin acid or cinnamic acid are suitable examples. It should be understood, however, that the functional derivatives of these acylating agents, such as the halides, esters or anhydrides, may be used.

Halogen-free, moth-proofing agents containing sulphonic acid groups have previously been suggested, produced in various ways. There may be mentioned hydroxytriarylmethanes containing sulphonic acid groups, produced by condensation of p-alkylated phenols and aldehyde sulphonic acids and so forth. These products in addition to having a low light fastness are fast neither to fulling nor to washing. Sulphonic acid groups-containing, halogen-free condensation products from alkylated phenols and derivatives of isatin do not acquire the strength possessed by halogen-free condensation products produced according to the present invention. Further condensation products of aldehyde sulphonic acids and partly halogen-free mercaptans have been proposed and also recommended as moth-proofing agents.

The following table shows that none of the above mentioned compounds is capable of producing such good or valuable properties as the halogen-free condensation products produced according to this invention, from aminoaryl sulphonic acids and aliphatic or araliphatic acylating agents as herein defined.

*Prescription for application and test*

The compounds are applied to wool fabric in the same way as acid dyestuffs from the acid bath and each is exposed to 10 moth larvae.

*Table*

| Compound | Fabric treated with 2 percent moth proofing agent | | | Fabric treated with 6 percent moth-proofing agent | | |
|---|---|---|---|---|---|---|
| | Dried | Washed | Fulled | Dried | Washed | Fulled |
| No. 1 | − | − | − | + | − | − |
| No. 2 | + | − | − | + | + | − |
| No. 3 | + | − | − | + | + | − |
| No. 4 | + | − | − | + | + | − |
| No. 5 (according to present application) | + | + | + | + | + | + |
| No. 6 (according to present application) | + | + | + | + | + | + |

+ Indicates protected; − Indicates insufficient protection against being moth eaten.

*Compound No. 1*

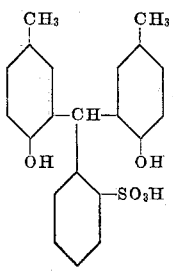

*Compound No. 2*

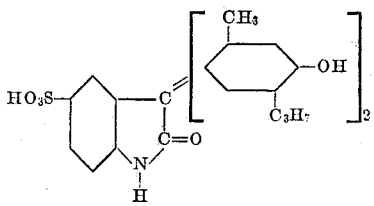

*Compound No. 3*

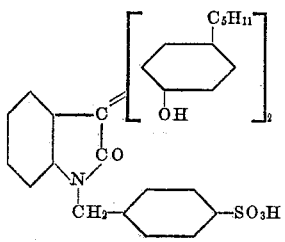

*Compound No. 4*

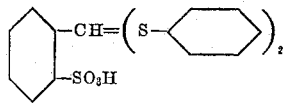

*Compound No. 5*

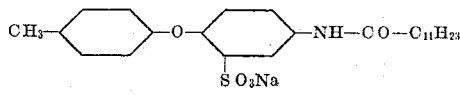

*Compound No. 6*

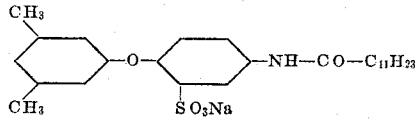

*Example 1*

30 parts of 4-amino-4'-methyl-1:1'-diphenylether-2-sulphonic acid are suspended in 300 parts by volume of dry pyridine and at ordinary temperature there are added in drops 27 parts of lauroyl chloride from technical lauric acid, and then stirring takes place at 30–40° C. until no further free amine is traceable. Then treatment is carried out with soda solution and the pyridine is distilled off with steam. The residue is allowed to cool, is acidified with hydrochloric acid and finally any fatty acid still present is extracted from the mixture. The condensation product corresponds with the formula

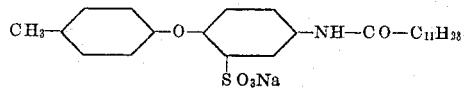

*Example 2*

28 parts of 4-amino-2'-methyl-5'-isopropyl-1:1'-diphenylether-2-sulphonic acid (produced from p-chloronitro-benzene-sulphonic acid and thymol, alkali salt, and subsequent reduction) are suspended in 200 parts by volume of dry pyridine, at ordinary temperature 15 parts of lauroyl chloride are added in drops and then stirring takes place at 30–40° C. until no further non-converted amine is present. The working up is effected as above. The condensation product corresponds with the formula

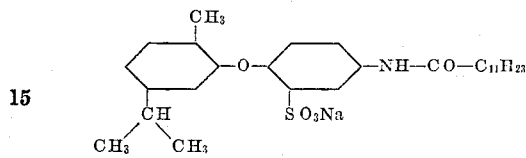

Instead of the amino-diphenylether sulphonic acid mentioned in the above examples there may be used other halogen-free compounds, for example:

2 - amino - 3':5'-dimethyl-1:1'-diphenylether-4-sulphonic acid,
4 - amino-3'-methyl-6'-isopropyl-1:1'-diphenylether-2-sulphonic acid,
2 - amino -3'-methyl-6'-isopropyl-1:1'-diphenylether-4-sulphonic acid,
2 - amino - 4'- amyl - 1:1'- diphenylether - 4-sulphonic acid,
2 - amino - 4'- amyl - 1:1'-diphenylether - 2'-sulphonic acid,
4 - amino - 4'- amyl - 1:1'-diphenylether - 2'-sulphonic acid,
2 - amino - 4'- tert.-butyl-1:1'-diphenylether-2'-sulphonic acid,
2 - amino - 4'-isohexyl-6'-methyl-1:1'-diphenylether-2'-sulphonic acid.

All these compounds are made according to known methods by reacting an alkali phenolate, for example the sodium salt of 3:5-dimethyl-1-hydroxylbenzene with a halogennitrobenzene body, containing exchangeable halogen, such as 4-chloronitrobenzene-3-sulphonic acid and subsequent reduction of the nitrodiphenylether obtained. The sulphonic acid group may also be introduced by after-sulphonation.

What we claim is:

1. A process for the manufacture of moth-proofing agents, comprising acylating 4-amino-4'-methyl-1:1'-diphenylether - 2 - sulphonic acid with lauroylchloride.

2. A process for the manufacture of a moth-proofing agent, comprising acylating 4-amino-4'-amyl - 1:1'-diphenylether - 2 - sulphonic acid with lauroylchloride.

3. A process for the manufacture of a moth-proofing agent, comprising acylating 4-amino-2'- methyl - 5'-isopropyl - 1:1' - diphenylether-2-sulphonic acid with lauroylchloride.

4. The alkyl substituted, halogen-free aminodiphenylether sulphonic acid of the formula:

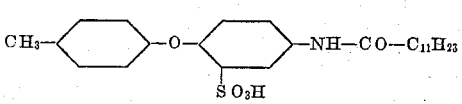

5. The alkyl substituted, halogen-free aminodiphenylether sulphonic acid of the formula:

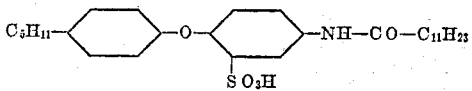

6. The alkyl substituted, halogen-free aminodiphenylether sulphonic acid of the formula:

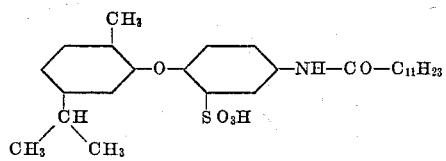

7. A process for the manufacture of moth-proofing agents comprising acylating a halogen-free aminodiphenylether sulphonic acid containing as substituents of the phenyl nuclei at least one alkyl group selected from the group consisting of alkyl radicals of 1 to 6 carbon atoms, with a high molecular aliphatic acylating agent to obtain an alkylsubstituted, halogen-free aminodiphenylether sulphonic acid substituted in its amino group by a high molecular acyl radical.

8. A process for the manufacture of moth-proofing agents comprising acylating a halogen-free aminodiphenylether sulphonic acid containing as substituents of the phenyl nuclei at least one alkyl group selected from the group consisting of alkyl radicals of 1 to 6 carbon atoms, with a lauroyl halide to obtain an alkyl-substituted, halogen-free aminodiphenylether sulphonic acid substituted in its amino group by a high molecular acyl radical.

9. The new halogen-free aminodiphenylether sulphonic acids containing as substituents of the phenyl nuclei at least one alkyl group selected from the group consisting of alkyl radicals of 1 to 6 carbon atoms substituted in their amino group by a high molecular aliphatic acyl radical and being valuable moth-proofing agents.

10. The new halogen-free aminodiphenylether sulphonic acids containing as substituents of the phenyl nuclei at least one alkyl group selected from the group consisting of alkyl radicals of 1 to 6 carbon atoms substituted in their amino group by the lauroyl radical and being valuable moth-proofing agents.

HENRY MARTIN.
HANS HEINRICH ZAESLIN.